Figure 1:
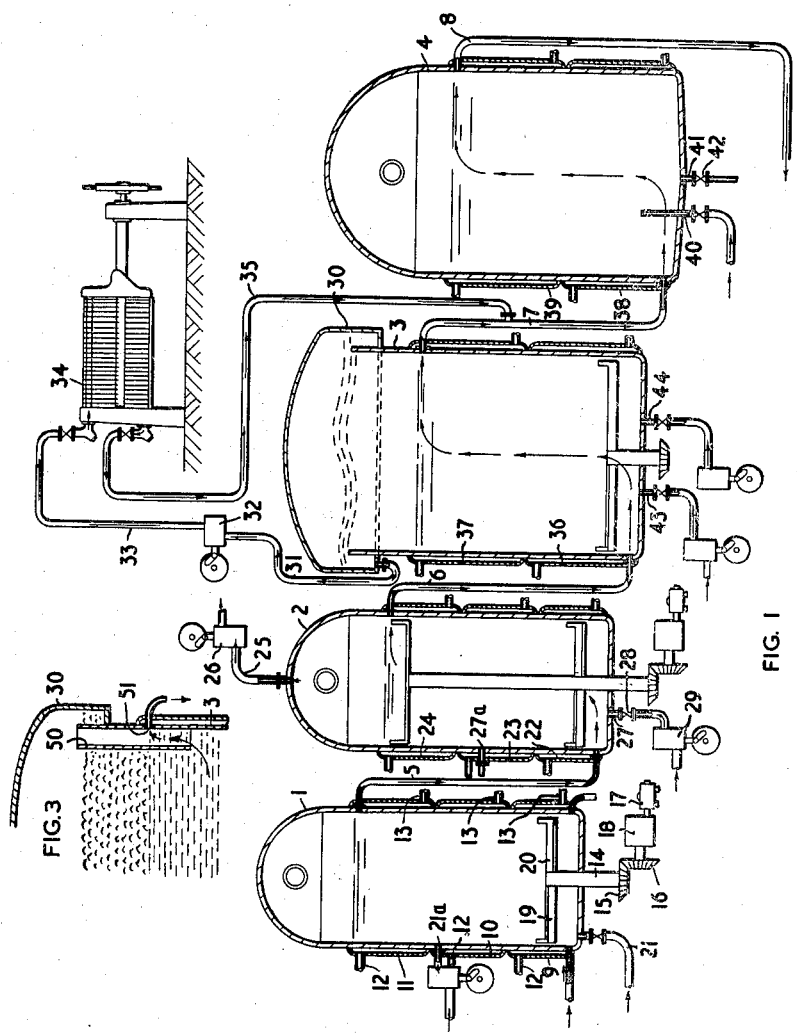

Aug. 17, 1965   R. P. WILLIAMS   3,201,328
CONTINUOUS FERMENTATION APPARATUS FOR BEER PRODUCTION
Original Filed March 24, 1961   2 Sheets-Sheet 1

INVENTOR:
REES PHILIP WILLIAMS

3,201,328
CONTINUOUS FERMENTATION APPARATUS
FOR BEER PRODUCTION
Rees Philip Williams, London, England, assignor to R. Ramsden & Son Limited, Darlington, England, and Charrington & Company Limited, London, England
Original application Mar. 24, 1961, Ser. No. 107,879. Divided and this application Feb. 5, 1962, Ser. No. 170,887
Claims priority, application Great Britain, Mar. 28, 1960, 10,855/60
4 Claims. (Cl. 195—141)

This application is a division from my co-pending application No. 107,879 filed March 24, 1961, now abandoned.

This invention relates to the manufacture of beer, and more particularly to the fermentation of "Brewers Wort," i.e. wort plus yeast as well known in the art, under steady rate conditions.

Hitherto, the fermentation process has been carried out, on a commercial scale, by batch processes which are relatively slow and involve the utilisation of relatively very bulky vessels for adequate production in quantity.

The object of the present invention is to provide apparatus suitable for use in carrying out such fermentation as a continuous process, with the advantages of relatively smaller vessels and higher production rate.

Fermentation of wort by yeast, in the production of beer, may be carried out by a continuous process including a first step of forming a mixture of sterile wort and yeast in first vessel means under temperature conditions selected to ensure multiplication of the yeast, a second step of continuously removing wort and yeast mixture which has dwelt in the first vessel means for a predetermined period of time and passing said removed mixture through second vessel means at a rate and under temperature conditions selected to ensure rapid fermentation by the yeast and production of a yeast crop, and a third step of continuously removing wort which has dwelt in the second vessel means for a predetermined period of time and passing said wort through third vessel means at a rate permitting settling.

According to the present invention, apparatus suitable for use in carrying out the above-described method, but not limited thereto, comprises a first vessel for making a ferment mixture such as sterile wort and yeast, means for controlling the temperature of the mixture in the first vessel, a second vessel having an inlet and an outlet, the inlet being connected to the outlet of the first vessel, means for controlling the temperture of mixture in the second vessel, a third vessel having an inlet and an outlet, the inlet being connected to the outlet of the second vessel, and means for controlling the temperature of fermented liquid in the third vessel.

The second vessel means could be simply a single vessel in which substantially the whole of the vigorous fermentation took place, but it is preferred to constitute the second vessel means by two vessels through which the mixture passes in succession, whereby the second method step referred to above itself includes two successive stages the first of which is a continuous passage of the mixture through a vessel at a rate and under conditions of temperature ensuring rapid fermentation, and the second of which is passage of the product through a further vessel at a rate and under conditions of temperature ensuring continuation of the rapid fermentation and a climax of the yeast crop production.

According to the type and characteristics of the beer to be produced, and of the wort and yeast to be used in the process, it is desirable to be able, at will, to both speed up and slow down the rate of fermentation. For this purpose, gas or a mixture of gases may be introduced in the first and/or the second vessel means according to the effect sought. For example, air or pure oxygen may be introduced to boost the fermentation action, i.e. to "rouse" the yeast, and carbon dioxide or nitrogen may be introduced to slow down the fermentation process.

During the latter part of the active fermentation phase a yeast head is produced, e.g. in the second vessel means (and in the second of the two individual vessels where two in series are used). This head my be continuously removed together with a small content of wort, this wort being separated and recirculated, e.g. introduced back into the flow path for example immediately after the second vessel means.

It is preferred to arrange the apparatus so that the entire flow occurs by gravity through vessels arranged in series at progressively lower levels.

In a preferred embodiment, the second vessel is in two parts which are connected serially and are each provided with their individual means for controlling the temperature of the mixture therein. It is further preferred to have the temperature controlling means acting independently at separate levels, e.g. by two or more fluid jackets arranged along the vessels wall.

Preferably also, each vessel is provided with means, such as a simple conduit connected to a pump or pressure source, for the introduction of gas for quickening (e.g. rousing) and for slowing of the fermentation.

The first vessel, wherein multiplication of the yeast takes place, may be provided with agitator means adjacent the inlet end for assisting the flow and a stirrer adjacent the outlet end for ensuring mixing.

Where the process involves the production of a head on the fermented material, e.g. a yeast head, means are advantageously provided for continuous removal of such a head from the vessel in which it occurs, e.g. means for removal of the relatively copious head formed during the climax of fermentation in the third vessel. Means may also be included for continuously treating the removed head material by pressing it for removal of its wort content for recirculation.

In a preferred embodiment, for use in brewing of beer, the series of vessels are arranged successively at lower levels to give a flow of liquid through the apparatus by gravity, the inlet of each vessel being adjacent to the lower part of that vessel and the outlet of each vessel being adjacent the upper part of that vessel.

Where a gas or gases are given off during the process, one or more of the vessels may be provided with means for continuous removal of the gas, e.g. for continuous removal of carbon dioxide from the second vessel.

Where the process being carried out involves the formation of solid deposits, means may be provided for its continuous removal, e.g. for the removal of sludge from the bottom of the second of the two serially connected parts of the second vessel.

Carbon dioxide gas may also be injected in the third vessel for gasifying of the liquor.

Where a relatively longer dwell time of the liquid in any vessel is desired, the cross-section of the vessel may be proportionately increased. Thus, by varying the size and cross-section of the vessels, the apparatus and process can be adjusted to suit the natural characteristics of the particular yeast which the brewer wishes to use.

The effect of fermentation is normally to cause the temperature of the liquor to rise, and suitable temperatures would be, for example, as follows:

|  | ° F. |
|---|---|
| (i) Feeding of wort to first vessel means | 50–60 |
| (ii) Removal of liquor from first vessel | 68 |
| (iii) Removal of liquor from second vessel | 70 |

(iv) Removal of liquor from yeast-head vessel __ 70
(v) Removal of liquor from the gasifying vessel, as beer _____ 68

The wort and yeast are mixed in the first vessel.

Each of the vessels referred to may consist of a number of vessels in parallel, to obtain a proportionately greater rate of production.

Figure 2:
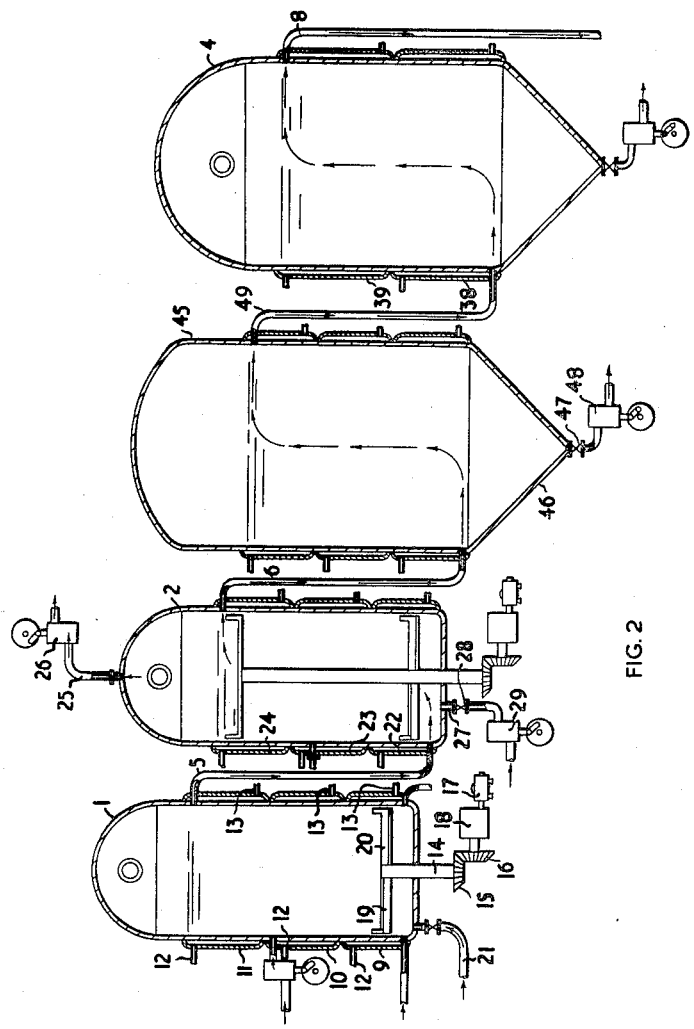

In order that the nature of the invention may be readily ascertained, two embodiments of apparatus respectively suitable for so-called top fermentation and bottom fermentation and methods by which they are utilised are hereinafter particularly described by way of example with reference to the figures of the accompanying drawings, wherein:

FIG. 1 is a schematic vertical section of a first embodiment of fermentation apparatus, suitable for top fermentation, e.g. of relatively heavy beers; FIG. 2 is a similar illustration of a second embodiment suitable for bottom fermentation of lighter beers, such as "Lager"; FIG. 3 is a partial vertical section, on an enlarged scale, of a detail of a modification applied to the third vessel of FIG. 1.

Referring to FIGURE 1, the apparatus includes four upright cylindrical vessels 1, 2, 3 and 4 arranged in descending order of levels, vessels 1, 2 and 3 each having their upper part connected to the lower part of the next succeeding vessel respectively by the conduits 5, 6 and 7. An outlet at the upper part of the last vessel 4 is connected by a conduit 8 to any convenient pumping means (not shown) for transfer of the finished product to a suitable place of storage or further treatment.

The first vessel 1 of the series is charged with sufficient yeast according to its capacity. The natural growth of the yeast will eventually ensure that the whole of the system becomes adequately charged, so that this first vessel may be considered also as a yeast culture plant.

Wort from any suitable source, enters the lower part of the first vessel 1. The incoming wort mixes with the yeast already in the vessel and while slowly travelling upwards is greatly "roused." About this vessel are arranged three separate jackets 9, 10, 11 each having an inlet 12 and an outlet 13 whereby any convenient liquid or gaseous heating or cooling medium can be passed through these jackets independently of each other to permit raising or lowering or stabilisation of the temperature of the liquid in the vessel at three major levels thereof.

Within the vessel 1 is disposed a shaft 14 driven at a suitable slow speed through bevel pinions 15, 16 by a motor 17 acting through a speed-reducing gear-box 18, the shaft carrying a pair of inclined impeller blades 19, 20 at its lower part to urge the liquid upwardly in the vessel and cause a general circulation from bottom to top.

In the base of the vessel 1 is provided an inlet conduit 21 through which carbon dioxide gas may be introduced for the purpose of slowing the fermentation action. Another pressurized gas inlet 21a is provided at an intermediate point up the vessel 1 for the introduction of air or oxygen for boosting the fermentation.

The wort is fed into vessel 1 at a temperature of 50–60° F. Fermentation commences and in this vessel a first head of yeast is produced at the top end, the temperature immediately under this head of yeast being in the region of 68° F. This liquid passes by gravity through the conduit 5 to the lower end of vessel 2. This vessel also has independently operable jackets 22, 23 and 24 at three levels. When the liquid has entered vessel 2, and whilst it passes slowly upwards therein, the fermentation continues at a rapid pace and carbon dioxide gas is given off, this being drawn off at the upper end of the vessel through a conduit 25 connected to any suitable suction device represented in this instance as a simple pump 26. As a result of this further fermentation, the yeast produces, on the surface of the liquid, what is known in the art as a "rocky head." During passage of the liquid from bottom to top of vessel 2, the temperature has risen to approximately 70° F., and there has been a steady fall in gravity. Liquid from the top end passes by gravity through the conduit 6 to the lower end of vessel 3. The bottom end of vessel 2 is likewise provided with an inlet conduit 27, valve 28 and representative pressure pump 29 for feeding in gas such as nitrogen if the yeast in the mixture should require slowing. A pressurized gas inlet 27a is provided at an intermediate point up the vessel 2 for entry of air or oxygen if the fermentation should require boosting.

Vessel 3 is made of somewhat larger cross-section than vessels 1 and 2, whereby the dwell time therein is appropriately increased. Further fermentation occurs in this third vessel and this reaches the peak of yeast production, with a further steady fall in gravity. A further yeast crop is produced and a head is formed at the surface of the liquid. The upper end of the vessel is provided with an annular tray 30 into which the yeast head can pass and from which it is removed, through a conduit 31 by any suitable suction device, represented in this drawing as a simple suction pump 32. Alternatively, the yeast could be removed by mechanical means. The collected yeast can then be treated in the orthodox manner for resale, it being emphasized that no further yeast need be added to the system at all, and wort need not be recirculated. The yeast head, plus a small content of wort, passes through a conduit 33 to a yeast press 34 which serves in well known manner to (a) compress the yeast for re-use, and (b) separate the traces of wort from the yeast, this separated wort being fed back into the system through a conduit 35.

Vessel 3 has two independently operable jackets 36, 37 by means of which the temperature of the liquid can be controlled at two major levels.

The temperature of the liquid immediately below the yeast head in vessel 3 is approximately 70° F., and this liquid is passed by gravity through conduit 7 to the bottom of vessel 4.

FIG. 3 shows, to a large scale, a baffle device which can be applied at the outlet of vessel 3. This baffle consists of a vertical half-cylindrical plate 50 which is secured opposite the outlet opening 51 and has its lower end immersed in the liquid and its upper end extending beyond the maximum height of the yeast head. The action of this baffle is to prevent the yeast head from being taken out through the outlet by the normal flow of liquid, whilst at the same time a small proportion of yeast in suspension (about 1%) is carried over to the fourth vessel in the liquid which passes out through the outlet. This is comparable with the result obtained in the existing batch systems.

Vessel 4, which is mainly a cooling and settling vessel, again has independently operable jackets 38 and 39 for temperature control. At the lower part of vessel 4 is provided an inlet conduit 40 through which carbon dioxide gas may be introduced, from any suitable pressure source, at a pressure of say two pounds per square inch, this serving both to ensure complete absence of air and to slightly carbonize the beer. A certain amount of settling and clarifying of the beer takes place in vessel 4, and an outlet conduit 41 with valve 42 is provided at the base of the vessel for connection to a sludge suction pump (not shown).

The beer passes up vessel 4 and is eventually drawn off at about 68° F. through conduit 8, which leads it to any suitable storing or conditioning means as desired.

The jacketing of the four vessels enables complete thermal control to be obtained, i.e. either cold or heated water can be passed through the independently operable jackets to maintain the fermentation at a predetermined rate, or to lower its speed, as may be required by the brewer.

The base gas inlets 21, 27 and 40 and also similar inlets 43, 44 of vessel 3, may also be used to feed in a gas or a mixture of gases selected to provide either a boosting or a slowing action on the fermentation.

Any sludge withdrawn from the base of vessel 4 through conduit 41 may be filtered by any known means (not shown) and the reclaimed wort passed back into vessel 4 at an inlet (not shown) part way up that vessel.

Such an apparatus and method is suitable for so-called "top fermentation" wherein the yeast rises to the top of each vessel during the process.

Referring now to FIGURE 2, there is shown a second embodiment of apparatus which is suitable for so-called "bottom-fermentation," i.e. wherein the yeast is eventually collected, in the third vessel, at the bottom of that vessel instead of at the top end thereof.

The entire apparatus, so far as concerns vessels 1 and 2 and the ancillary apparatus and supplies connected thereto, is identical with that described in relation to FIG. 1. The third vessel 45 however, instead of having a collector tray 30 (see FIG. 1) has a simple closed top and is formed with a conical base 46 which terminates at its bottom end in an outlet valve 47 leading to a suction device represented here by a simple suction pump 48. Vessel 4 likewise has a conical base, and yeast can also be drawn off at the lower end similarly to vessel 3.

Due to the different manner of "bottom" fermentation described below, the gravity of the beer in the vessel 45 is somewhat less than that found in the vessel 3 of FIG. 1, to the extent that the yeast does not rise to the top but instead sinks in the liquid and collects in cone 46. The yeast, plus a content of wort, is pumped off through the valve 47 and is passed to a yeast press similar to that shown at 34 in FIG. 1. The yeast can be re-used, and the small wort content can be introduced back into the system through an inlet conduit at some suitable point such as part-way up the vessel 45, or in the conduit 49 connecting that vessel to the fourth vessel.

In lager brewing it is customary to use lower fermentation temperatures than in the production of top fermentation beer. Accordingly in the modified apparatus of FIG. 2, the yeast reproduction and the onset of fermentation is carried out at 60° F. Once this stage has been reached, the temperature is successively dropped by 5° F. at each vessel, so that in vessel 4 the temperature is 45° F. This drop in temperature serves the dual purpose of simulating temperatures used in the conventional batch production of "Lager," and of assisting in the natural sedimentation of the yeast.

It will be well known to those skilled in the art of brewing that each yeast has a typical fermentation graph. Accordingly, the vessels would in practice be varied in relative size so that, although the rate of flow into a vessel is obviously equal to the rate of flow out of it, the practical effect is a greater or lesser dwell time according as the vessel size is increased or decreased.

Although the apparatus of FIGS. 1 and 2 has been shown as gravity fed throughout, the liquid could be pumped between vessels if required.

The four vessels of both FIGS. 1 and 2 are shown as being laterally displaced into a side by side position, as well as progressively lowered to provide gravity flow. It is pointed out that the four vessels could also be arranged in vertical alignment, e.g. in a stacked formation. Further, where the vessels are arranged in side by side formation, as illustrated, they could be constituted by chambers of a single vessel partitioned of one from the next, or by individual vessels but having common side walls.

Such apparatus has the advantage that, if the plant is made initially sterile and is fed with sterile wort, no infection can take place because the vessels are totally enclosed. The conditions of flow permitting normal fermentation temperatures to be used, and the absence of vigorous rousing, ensures that there is no deficiency in the beer of its flavouring characteristics.

I claim:

1. Apparatus for use in continuous fermentation production of beer, comprising a series of connected vessels of varying capacities in which the capacities are selected to provide a dwell time in each phase in said series of vessels corresponding to the dwell time in batch beer fermentation processes including a first vessel for making a mixture of sterile wort and yeast in a first phase, means for controlling the temperature of the contents of the first vessel, a second vessel in a second phase having an inlet and an outlet, the inlet being connected to the outlet of the first vessel, means for controlling the temperature of the contents of the second vessel, a third vessel in a third phase having an inlet and an outlet, the inlet being connected to the outlet of the second vessel, means for continuous removal of yeast from said second vessel, and means for controlling the temperature of fermented liquid in the third vessel, the capacity of each vessel being selected relative to the capacity of each vessel so that the relative dwell time of the contents in each vessel differs at constant feed and discharge rates, the dwell time in each vessel being comparable relative to each other vessel to the relative dwell times in a batch fermentation system.

2. Apparatus as claimed in claim 1, wherein the second vessel is subdivided into parts connected serially and each part is provided with means for controlling the temperature of the mixture therein.

3. Apparatus as claimed in claim 2, including means for continuous pressing of the removed yeast and recirculation of its wort content.

4. Apparatus as claimed in claim 3, wherein the inlet of each vessel is adjacent the lower part of the vessel and the outlet of each vessel is adjacent the upper part of the vessel, the series of vessels being arranged successively at lower levels whereby the flow of liquid through the apparatus is obtained by gravity.

References Cited by the Examiner

UNITED STATES PATENTS

| | | | |
|---|---|---|---|
| 2,155,134 | 4/39 | Karsch | 195—115 X |
| 2,371,208 | 3/45 | Alzola | 195—137 X |
| 2,823,267 | 2/58 | Schwaiger | 99—31 |
| 2,967,107 | 1/61 | Geiger et al. | 99—43 |

FOREIGN PATENTS

| | | |
|---|---|---|
| 216,618 | 8/58 | Australia. |
| 242,114 | 11/25 | Great Britain. |

A. LOUIS MONACELL, *Primary Examiner.*

TOBIAS E. LEVOW, *Examiner.*

UNITED STATES PATENT OFFICE
CERTIFICATE OF CORRECTION

Patent No. 3,201,328

August 17, 1965

Rees Philip Williams

It is hereby certified that error appears in the above numbered patent requiring correction and that the said Letters Patent should read as corrected below.

Column 6, lines 29 and 30, for "of each vessel" read -- of each other vessel --.

Signed and sealed this 15th day of March 1966.

(SEAL)
Attest:

ERNEST W. SWIDER
Attesting Officer

EDWARD J. BRENNER
Commissioner of Patents